United States Patent [19]

Morita et al.

[11] Patent Number: 4,742,103

[45] Date of Patent: May 3, 1988

[54] CURABLE ORGANOPOLYSILOXANE COMPOSITIONS EXHIBITING IMPROVED ADHESION

[75] Inventors: Yoshitsugu Morita; Shoichi Shida, both of Chiba, Japan

[73] Assignee: Toray Silicone Co., Ltd., Tokyo, Japan

[21] Appl. No.: 29,014

[22] Filed: Mar. 23, 1987

[30] Foreign Application Priority Data

Apr. 11, 1986 [JP] Japan ................................. 61-83577

[51] Int. Cl.$^4$ ............................................. C08K 5/41
[52] U.S. Cl. ................................. 524/174; 524/176; 524/262; 524/264; 524/398; 524/399; 524/356; 524/730; 524/731; 524/770; 524/780; 524/773; 524/783; 524/786; 528/15; 528/31; 528/32; 525/478

[58] Field of Search ............... 524/262, 264, 174, 176, 524/398, 399, 356, 730, 731, 770, 780, 773, 783, 786; 528/15, 31, 32; 525/478

[56] References Cited

U.S. PATENT DOCUMENTS

| | | | |
|---|---|---|---|
| 4,617,238 | 10/1986 | Crivello et al. | 528/32 |
| 4,631,321 | 12/1986 | Suzuki | 528/15 |
| 4,683,278 | 7/1987 | Suzuki | 528/15 |

*Primary Examiner*—Melvyn I. Marquis
*Attorney, Agent, or Firm*—Robert Spector

[57] ABSTRACT

The adhesion of organopolysiloxane compositions curable by a platinum catalyzed hydrosilation reaction to various substrates, particularly plastics, is improved by the presence in said compositions of (1) an organosilicon compound containing an ethylenically unsaturated group and at least one alkoxy group and (2) at least one member from a specified class of compounds of aluminum or zirconium.

9 Claims, No Drawings

CURABLE ORGANOPOLYSILOXANE COMPOSITIONS EXHIBITING IMPROVED ADHESION

BACKGROUND OF THE INVENTION

1. Field of the Invention

The present invention relates to curable organopolysiloxane compositions. More specifically, the present invention relates to curable organopolysiloxane compositions which cure by the addition reaction of silicon-bonded lower alkenyl radicals with silicon-bonded hydrogen atoms and exhibit excellent adhesion to a variety of substrates.

2. Description of the Prior Art

Organopolysiloxane compositions curable by a platinum catalyzed addition reaction of an organohydrogensiloxane to an organopolysiloxane containing ethylenically unsaturated hydrocarbon radicals have heretofore been used in numerous fields of industry because they do not generate by-products during curing, because they can be cured by heating at relatively low temperatures for short periods of time, and because they have an excellent flame retardancy and the ability to function as electrical insulators.

However, because addition-curable organopolysiloxane compositions do not adhere well to substrates with which they are in contact during curing, the surface of the substrate must be preliminarily treated with a primer. This is disadvantageous from the standpoints of productivity, labor and cost. As a consequence, numerous techniques have been proposed for imparting adhesion by, among other means, the blending of particular types of silanes and polysiloxanes into such compositions. Among these, there have been more than a few proposals to the effect that an unsaturated group-containing organosilicon compound be added as an adhesion promoter. Organosilicon compounds proposed for this purpose include acryloxyalkyl group-containing silanes or siloxanes as taught in Japanese Patent Publication 51-28309 (28,309/76), unsaturated group-containing alkoxysilanes disclosed in Japanese Patent Publication 56-9183 (9,183/81), partial hydrolyzates of the aforementioned unsaturated group-containing alkoxysilane as taught in Japanese Laid Open Patent Application (Kokai) Number 54-135844 (135,844/79), partial hydrolysis condensates of mixtures of a vinyltrichlorosilane and a vinyltrialkoxysilane as taught in Japanese Patent Publication 47-36255 (36,255/72), and organopolysiloxanes having acryloxy or methacryloxy groups at the molecular terminals as disclosed in Japanese Patent Publication 55-39258 (39,258/80).

While the adhesion promoters disclosed in the aforementioned prior art provide excellent adhesion to metals, the curable compositions suffer from the problem that the adhesion to plastics in particular is unsatisfactory.

Accordingly, the present inventors examined various methods in order to overcome the problem in said prior art, and the present invention was developed as a result.

An objective of the present invention is to provide a curable organopolysiloxane composition which will tightly bond to substrates such as metals, glass, ceramics, stone, concrete, wood, paper, fibers, rubber and leather, and which in particular will also tightly bond to substrates to which good adhesion has not previously been possible. Substrates of this latter type include plastics such as polybutylene terephthalate, polycarbonates, polyolefins, polyphenylene oxide, polyamides, and polyphenylene sulfide.

SUMMARY OF THE INVENTION

The aforementioned objective of the present invention is accomplished by including in an organosiloxane composition that is curable by a platinum catalyzed addition reaction a lower alkenyl substituted alkoxysilane and a specified class of aluminum or zirconium compounds.

DETAILED DESCRIPTION OF THE INVENTION

This invention provides a curable organosiloxane composition comprising (A) 100 parts by weight of an organopolysiloxane containing at least 2 silicon-bonded lower alkenyl radicals in each molecule, (B) from 0.3 to 40 parts by weight of an organohydrogenpolysiloxane containing at least 2 silicon-bonded hydrogen atoms in each molecule, (C) a catalytically effective amount of a platinum-group metal or a compound of said metal, (D) from 0.1 to 30 weight parts of either an organosilicon compound having both ethylenically unsaturated and alkoxy groups bonded to silicon or a partial hydrolysis condensate of said organosilicon compound, and (E) from 0.001 to 10 parts by weight of either (1) an aluminum or zirconium compound, where said compound is an alkoxide, a phenoxide, a carboxylate, or a derivative of a beta-diketone or o-hydroxyketone, or (2) a reaction product of said aluminum or zirconium compound with said organosilicon compound.

Each component of the present compositions will now be described in detail.

The organopolysiloxane comprising component (A) is the principal constituent of the present composition. Any of the known organopolysiloxanes containing at least 2 silicon-bonded lower alkenyl radicals in each molecule are suitable. The molecular configuration can range from straight chain to cyclics to network resins, or a mixture thereof, and the viscosity measured at 25 degrees C. can range from 10 cP (0.01 Pa.s) to that of a gum or solid. The cured product will be brittle if the viscosity of component (A) is less that 10 cP, and this is undesirable. Preferred organopolysiloxanes have straight chains and viscosities of 50 to 100,000 cP (0.05 to 100 Pa.s).

The silicon-bonded organic groups in the siloxane units of component (A) are monovalent hydrocarbon radicals, which may or may not be identical, and which are exemplified by alkyl radicals such as methyl, ethyl, propyl and butyl; cycloalkyl radicals such as cyclohexyl; lower alkenyl radicals such as vinyl and allyl; aryl radicals such as phenyl and xylyl; aralkyl radicals such as phenylethyl; and halogenated monovalent hydrocarbon radicals such as gamma-chloropropyl and 3,3,3-trifluoropropyl. The lower alkenyl radicals required in component (A) can be present at any position in the molecule, but are preferably present at least at the molecular chain terminals. The lower alkenyl radicals are preferably vinyl. The substituents present at the molecular chain terminals include triorganosiloxy groups such as trimethylsiloxy, dimethylvinylsiloxy, dimethylphenylsiloxy and methylvinylphenylsiloxy; the hydroxyl group; and alkoxy groups. The type of monovalent hydrocarbon radical in the siloxane units, the type of group located at the molecular chain terminals and the viscosity of component (A) are suitably selected based on the application of the curable composition.

While it is preferred that a straight-chain organopolysiloxane be used alone as component (A), the joint use of an organopolysiloxane resin, or the use of only an organopolysiloxane resin, is permissible. In the case of joint use, no particular limiting conditions are placed on the organopolysiloxane resin. However, if the resin is the only ingredient in component (A), it must contain at least 10 mol% and preferably at least 30 mol% of $R_2SiO$ units, where R represents a monovalent hydrocarbon radical. Preferably a plurality of linear organopolysiloxane blocks $(R_2SiO)_n$ are present in the resin, where the value of n is at least 10, preferably at least 20 and more preferably at least 30; however, these linear organopolysiloxane block are not essential.

The organohydrogenpolysiloxane comprising component (B) is the crosslinker which causes curing by an addition reaction with the lower alkenyl radicals of component (A) under the catalytic activity of component (C). The organohydrogenpolysiloxane contains at least two silicon bonded hydrogen atoms per molecule, and can a homopolymer or a copolymer. The configuration of this component can be linear, cyclic or it can have a network structure, with linear or cyclic molecules being preferred. The viscosity of component (B) at 25 degrees C. can be from 1 to 10,000 cP (0.001 to 10 Pa.s).

In addition to hydrogen atoms, the substituents bonded to the silicon atoms of component (B) are monovalent hydrocarbon or substituted hydrocarbon radicals, as exemplified by methyl, ethyl, butyl, phenyl and 3,3,3-trifluoropropyl. Methyl is particularly preferred among these. The concentration of organohydrogenpolysiloxane in the present curable compositions is equivalent to from 0.5 to 5 silicon-bonded hydrogen atoms, preferably 0.7 to 2 silicon-bonded hydrogen atoms, for each silicon-bonded alkenyl radical in component (A). This condition is usually satisfied by the presence of from 0.3 to 40 weight parts of organohydrogenpolysiloxane per 100 weight parts component (A).

A platinum-group metal or a compound thereof constitutes the catalyst, component (C), of the present composition. This component is exemplified by finely divided elemental platinum, finely divided platinum dispersed on carbon powder, chloroplatinic acid, chloroplatinic acid-olefin coordination compounds, chloroplatinic acidvinylsiloxane coordination compounds, tetrakis(triphenylphosphine)palladium and rhodium catalysts. The catalyst is present in an amount equivalent to from 0.1 to 1,000 ppm by weight, preferably from 0.5 to 200 ppm, of platinum or other platinum group metal based on the weight of component (A).

Component (D) is an organosilicon compound having both ethylenically unsaturated substituents and alkoxy groups bonded to silicon. The combination of components (D) and (E) is required to impart excellent adhesion to the present compositions. Any organosilicon compound can be used as component (D) as long as it contains at least 1 group containing ethylenic unsaturation and at least 1, preferably at least 2, alkoxy groups in each molecule.

A preferred class of organosilicon compounds can be represented by the formula $XY_mSi(OR)_{3-m}$, where X is vinyl, allyl or gamma-methacryloxypropyl, Y is methyl, R is methyl or 2-methoxyethyl and m is 0 or 1.

These preferred organosilicon compounds are exemplified by compounds of the formulae $CH_2=CHSi(OCH_3)_3$ $CH_2=CHSi(OC_2H_5)_3$ $(CH_2=CH)(CH_3)Si(OCH_3)_2$ $CH_2=CHSi(OC_2H_4OCH_3)_3$ $CH_2=CHCH_2(CH_3)Si(OC_2H_5)_2$ $CH_2=CHCH_2Si(OCH_3)_3$

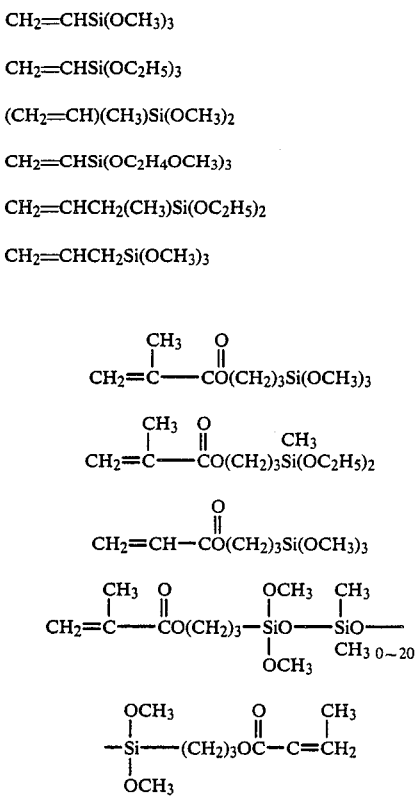

The definition of component (D) includes both partial hydrolysis condensates of one or more of these organosilicon compounds and partial hydrolysis condensates of one or more of these compounds with alkoxysilanes other than those corresponding to the present definition of component (D).

The concentration of component (D) in the present compositions is within the range of from 0.1 to 30 parts by weight, preferably from 0.5 to 10 parts by weight, per 100 parts by weight of component (A). Less than about 0.1 part will not impart sufficient adhesion, while the addition of more than about 30 parts by weight will adversely affect the physical properties of the cured material.

The aluminum compound or zirconium compound constituting component (E) serves to further improve the adhesion of the present curable compositions by its combined use with component (D). The aluminum compounds and zirconium compounds are alkoxides, phenoxides and carboxylates and these compounds wherein one or more of the alkoxide, phenoxide or carboxyl groups are replaced by organic ligands or organosilicon groups derived from component (D) as described hereinafter. The alkoxy groups are exemplified by methoxy, ethoxy and iso-propoxy; the phenoxy groups are exemplified by phenoxy and p-methylphenoxy; and the carboxyl groups are exemplified by acetoxy, propionyloxy, isopropionyloxy, butyroxy and stearoyloxy.

Aluminum compounds useful in the present compositions include, for example, aluminum triisopropoxide, aluminum t-butoxide, aluminum triacetate, aluminum tristearate and aluminum tribenzoate. Furthermore, in these compounds, 1 or more of the alkoxy, phenoxy or carboxyl groups can be replaced by either organic ligands, examples of which are beta-diketone compounds and o-hydroxyketone compounds, or by a group derived from reaction of the aluminum or zirconium compound with component (D).

Beta-diketone compounds have one of the following chemical formulae (1), (2) or (3).

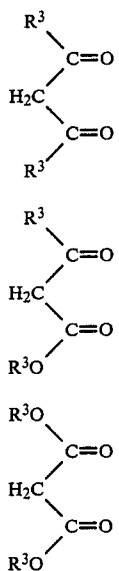

In these formulae $R^3$ represents an alkyl radical or halogen-substituted alkyl radical.

The o-hydroxyketone compounds have chemical formula (4).

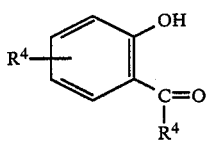

In this formula $R^4$ represents a hydrogen atom, an alkyl radical, a halogen-substituted alkyl radical or an alkoxy group.

The zirconium compounds useful as component (E) are analogs of the aforementioned aluminum compounds. Specific examples are $Zr(OH)_2(C_2H_3O_2)_2$ and $Zr[CH(COCH_3)_2]_4$.

As discussed above, in some instances component (E) will be reacted beforehand with ingredient (D) by heating. The resultant reaction product having Al—O—Si or Zr—O—Si bonds is then added to ingredient (a).

Component (E) is present within the range of 0.001 to 10 parts by weight, preferably from 0.01 to 5 parts by weight per 100 parts by weight of component (A). The presence of too little component (E) will not provide an increase in adhesion, while the addition of an excess quantity is uneconomical, although the properties will not be significantly adversely affected.

In addition to the aforementioned components (A) through (E), filler can be added to the present compositions as necessary. Such fillers are exemplified by fumed silica, hydrophobicized fumed silica, precipitated silica, hydrophobicized precipitated silica, fused silica, finely divided quartz, diatomaceous earth, talc, calcium carbonate, zinc oxide, titanium dioxide, ferric oxide, glass fiber, glass beads, glass balloons, silicon carbide, nitrogen carbide, manganese carbonate, carbon black, cerium hydroxide, pigments, etc. The filler will in general be added in amounts of from 10 to 300 parts by weight per 100 parts by weight of component (A).

Additional materials that can be present in the compositions of this invention include but are not limited to reaction inhibitors, organic solvents, thermal stabilizers, aging retardants, and antimolds.

The following examples describe preferred embodiments of the present compositions, but should not be interpreted as limiting the scope of the invention defined in the accompanying claims. All parts specified in the examples are by weight, and viscosities are measured at 25 degrees C.

EXAMPLES 1 AND 2

The following ingredients were combined and mixed to homogeneity: 100 parts of a dimethylvinylsiloxy-terminated dimethylpolysiloxane with a viscosity of 1,000 cP (1 Pa.s), 20 parts finely divided quartz, 5 parts of a trimethylsiloxy-terminated methylhydrogenpolysiloxane with a viscosity of 10 cP (0.01 Pa.s), an amount of an isopropanol solution of chloroplatinic acid equivalent to 10 ppm of platinum based on the weight of the aforementioned dimethylpolysiloxane, and the components (D) and (E) listed in Table 1. The composition was inserted between polybutylene terephthalate (PBT) plates and cured by heating for two hours in a convection oven maintained at 100 degrees C. to evaluate the adhesion of the composition to the plates. The results are reported in Table 1.

The adhesion was evaluated on a 3 level scale: +=cohesive failure, in which the rubber layer ruptures; x=partial cohesive failure; #=peeling at the interface.

TABLE 1

|  | Examples | | Comparison Examples | | | |
|---|---|---|---|---|---|---|
|  | 1 | 2 | 1 | 2 | 3 | 4 |
| (D) allyltrimethoxysilane (parts) | 1.5 | 2 | — | 1.5 | — | — |
| (E) aluminum acetylacetonate (parts) | 0.1 | 0.5 | — | — | 0.1 | 0.1 |
| gamma-glycidoxypropyl-trimethoxysilane (parts) | — | 0.2 | — | — | — | 1.5 |
| adhesion to PBT plate | + | + | × | × | × | # |

EXAMPLES 3 AND 4

Adhesion was evaluated using the method and composition of Examples 1 and 2, with the exception that component (D) and the substrate were replaced with the ones listed in Table 2. In this table PC represents a polycarbonate, and the partial hydrolysis condensate was a co-condensate with a viscosity of 15 cP (0.015 Pa.s) produced by the partial hydrolysis of vinyltrimethoxysilane and gamma-glycidoxypropyltrimethoxysilane in a weight ratio of 10:2, respectively.

TABLE 2

|  | Examples | | Comparison Examples | | | |
|---|---|---|---|---|---|---|
|  | 3 | 4 | 5 | 6 | 7 | 8 |
| (D) gamma-methacryloxypropyl-trimethoxysilane (parts) | 2 | — | — | 2 | — | — |
| partial hydrolysis co-condensate (parts) | — | 4 | — | — | — | 4 |

TABLE 2-continued

|  | Examples | | Comparison Examples | | | |
|---|---|---|---|---|---|---|
|  | 3 | 4 | 5 | 6 | 7 | 8 |
| (E) aluminum acetylacetonate (parts) | 0.2 | 0.3 | — | — | 0.2 | — |
| adhesion to PC plate | + | + | × | × | × | × |
| adhesion to glass plate | + | + | × | # | × | + |

EXAMPLE 5

100 Parts dimethylvinylsilyl-terminated dimethylpolysiloxane with a viscosity of 2,000 cP (2 Pa.s), 30 parts finely divided quartz, 5 parts of a trimethylsiloxy terminated copolymer containing an average of 10 dimethylsiloxane units and 5 methylhydrogensiloxane units per molecule, an amount of an isopropanol solution of chloroplatinic acid equivalent to 10 ppm of platinum based on the weight of the aforementioned dimethylpolysiloxane, and the components (D) and (E) as shown in Table 3 were mixed with each other to homogeneity, and then cured as described in Example 1 to evaluate the adhesion of the composition. These results are reported in Table 3.

TABLE 3

|  | Examples | | Comparison Examples | | | |
|---|---|---|---|---|---|---|
|  | 5 | 6 | 9 | 10 | 11 | 12 |
| (D) allyltrimethoxysilane (parts) | 1.5 | — | — | 1.5 | — | — |
| gamma-methacryloxypropyl-trimethoxysilane (parts) | — | 2 | — | — | 2 | — |
| (E) zirconium acetylacetonate (parts) | 0.2 | 0.2 | — | — | — | 0.2 |
| adhesion to PBT plate | + | + | × | × | × | × |
| adhesion to PC plate | + | + | × | × | × | × |

Because the curable organopolysiloxane compositions of the present invention contains both a member of a specified group of aluminum or zirconium compounds and an organosilicon compound having both silicon-bonded unsaturated groups and alkoxy groups, the compositions are characterized by excellent adhesion to various substrates, particularly plastics, which heretofore have been difficult to bond. Accordingly, the compositions will be very useful not only as an adhesive, sealant, coating agent or impregnating material for metals, glass, ceramics, stone, concrete, wood, paper, fiber, plastics, rubbers and leather, among others, but will also be very useful as a sealant, casting agent, coating agent or adhesive for various electric and electronic parts such as transistors, integrated circuits, diodes, thermistors, transformer coils and resistors.

That which is claimed is:

1. A curable organosiloxane composition comprising
(A) 100 parts by weight of an organopolysiloxane containing at least 2 silicon-bonded lower alkenyl groups in each molecule,
(B) from 0.3 to 40 parts by weight of an organohydrogenpolysiloxane containing at least 2 silicon-bonded hydrogen atoms in each molecule,
(C) a catalytically effective amount of a platinum-group metal or a compound of said metal,
(D) from 0.1 to 30 weight parts of either an organosilicon compound having both ethylenically unsaturated and alkoxy groups bonded to silicon or a partial hydrolysis condensate of said organosilicon compound, and
(E) from 0.001 to 10 parts by weight of either (1) a compound of either aluminum or zirconium, where said compound is an alkoxide, a phenoxide, a carboxylate, or a derivative of a beta-diketone or o-hydroxyketone, or (2) a reaction product of said aluminum or zirconium compound with said organosilicon compound.

2. A composition according to claim 1 where said organopolysiloxane is a liquid diorganovinylsiloxy terminated diorganopolysiloxane, said organohydrogenpolysiloxane is linear and contains at least three silicon bonded hydrogen atoms per molecule, and all of the silicon bonded organic groups other than vinyl present in components (A) and (B) are methyl, phenyl or 3,3,3-trifluoropropyl.

3. A composition according to claim 2 where said organosilicon compound is represented by the formuala $XY_mSi(OR)_{3-m}$, where X is vinyl, allyl or gamma-methacryloxypropyl, Y is methyl, R is methyl or 2-methoxyethyl and m is 0 or 1, said compound of aluminum or zirconium is a derivative of a beta-diketone and is present at a concentration of from 0.5 to 10 parts by weight per 100 parts of component (A), and all of the silicon bonded hydrocarbon radicals other than vinyl present in components (A) and (B) are methyl.

4. A composition according to claim 3 where said organosilicon compound is present at a concentration of from 0.5 to 10 parts by weight per 100 parts of component (A).

5. A composition according to claim 3 where said partial hydrolysis condensate of said organosilicon compound is a cohydrolysis condensate of said organosilicon compound with an alkoxysilane that is free of ethylenic unsaturation.

6. A composition according to claim 5 where said alkoxysilane is 3-gylcidoxypropyltrimethoxysilane.

7. A composition according to claim 3 where said compound of aluminum or zirconium is the acetylacetonate.

8. A composition according to claim 1 where said composition contains from 10 to 300 parts by weight of a filler for each 100 parts by weight of component (A).

9. A composition according to claim 8 where said filler is finely divided quartz.

* * * * *